(12) United States Patent
Knee

(10) Patent No.: US 8,855,443 B2
(45) Date of Patent: Oct. 7, 2014

(54) DETECTION OF NON-UNIFORM SPATIAL SCALING OF AN IMAGE

(75) Inventor: Michael James Knee, Petersfield (GB)

(73) Assignee: Snell Limited, Reading, Berkshire (GB)

(*) Notice: Subject to any disclaimer, the term of this patent is extended or adjusted under 35 U.S.C. 154(b) by 890 days.

(21) Appl. No.: 12/786,154

(22) Filed: May 24, 2010

(65) Prior Publication Data

US 2010/0316297 A1 Dec. 16, 2010

(30) Foreign Application Priority Data

Jun. 11, 2009 (GB) .................................. 0910037.1

(51) Int. Cl.
*G06K 9/32* (2006.01)
*G06T 7/00* (2006.01)
*G06T 7/40* (2006.01)
*H04N 5/21* (2006.01)
*H04N 7/01* (2006.01)

(52) U.S. Cl.
CPC ............... *G06T 7/0002* (2013.01); *G06T 7/403* (2013.01); *H04N 7/0122* (2013.01); *G06T 2207/30168* (2013.01); *H04N 5/21* (2013.01); *G06T 2207/20021* (2013.01); *G06T 2207/10016* (2013.01)
USPC ............................ 382/298; 382/100; 382/300

(58) Field of Classification Search
None
See application file for complete search history.

(56) References Cited

U.S. PATENT DOCUMENTS

| 6,016,152 | A | * | 1/2000 | Dickie | 345/648 |
| 6,285,349 | B1 | * | 9/2001 | Smith | 345/690 |
| 6,340,992 | B1 | | 1/2002 | Markandey | |
| 6,370,480 | B1 | | 4/2002 | Gupta et al. | |
| 6,747,619 | B1 | * | 6/2004 | Tanahashi et al. | 345/87 |
| 6,791,620 | B1 | * | 9/2004 | Elswick et al. | 348/441 |
| 8,004,543 | B2 | * | 8/2011 | Heo | 345/660 |
| 8,120,706 | B1 | * | 2/2012 | Verbeck et al. | 348/556 |
| 8,280,191 | B1 | * | 10/2012 | Avidan et al. | 382/298 |
| 2003/0147551 | A1 | | 8/2003 | Sathyanarayana | |
| 2005/0024532 | A1 | | 2/2005 | Choi | |
| 2005/0084175 | A1 | * | 4/2005 | Olszak | 382/284 |
| 2005/0248590 | A1 | * | 11/2005 | Tian et al. | 345/660 |
| 2006/0093236 | A1 | * | 5/2006 | Drezner et al. | 382/272 |
| 2006/0147128 | A1 | * | 7/2006 | Kondo et al. | 382/300 |
| 2007/0092108 | A1 | * | 4/2007 | Alattar et al. | 382/100 |

(Continued)

FOREIGN PATENT DOCUMENTS

| EP | 1286306 | 2/2003 |
| GB | 2454712 A | 5/2009 |
| GB | 2458934 | 10/2009 |
| WO | 2009008174 | 1/2009 |

OTHER PUBLICATIONS

GB0910037.1 Search Report dated Sep. 15, 2009; 1 page.
EP10158709 European Search Report dated Sep. 7, 2010, 2 pages.

*Primary Examiner* — Jayesh A Patel
(74) *Attorney, Agent, or Firm* — Michael Best & Friedrich LLP

(57) ABSTRACT

To detect non-uniform spatial scaling of an image in the horizontal direction (for example in 4:3 to 16:9 aspect ratio conversion) the image is divided into regions, for example a middle region and two side regions. A measure of horizontal spatial frequency energy is taken in each region by for example subtracting the values of horizontally adjacent pixels and a comparison is made between measures of horizontal spatial frequency energy for the different regions.

12 Claims, 2 Drawing Sheets

(56) References Cited

U.S. PATENT DOCUMENTS

| | | | |
|---|---|---|---|
| 2007/0152990 A1* | 7/2007 | Callway | 345/204 |
| 2007/0217660 A1* | 9/2007 | Komura et al. | 382/115 |
| 2008/0240235 A1* | 10/2008 | Holcomb et al. | 375/240.03 |
| 2009/0002398 A1* | 1/2009 | Goerzen | 345/660 |
| 2009/0175538 A1* | 7/2009 | Bronstein et al. | 382/173 |
| 2009/0190846 A1* | 7/2009 | Mevissen | 382/236 |
| 2009/0202177 A1* | 8/2009 | Jeffrey | 382/298 |
| 2009/0315917 A1* | 12/2009 | Uehori et al. | 345/668 |
| 2010/0030506 A1* | 2/2010 | Cairnduff | 702/104 |
| 2010/0303384 A1* | 12/2010 | Knee | 382/298 |

* cited by examiner

DETECTION OF NON-UNIFORM SPATIAL SCALING OF AN IMAGE

RELATED APPLICATION

The present application claims the benefit of prior filed Great Britain Patent Application No. GB 0910037.1, filed Jun. 11, 2009, the entire contents of which are hereby incorporated by reference.

FIELD OF THE INVENTION

This invention concerns image analysis; in particular the detection of spatially-dependant re-scaling.

BACKGROUND

It is now common practice to modify television material to account for different display aspect ratios (image width to height ratios). Aspect ratios of 4:3 and 16:9 are widely used and conversion of images originated in one of these ratios for display at the other ratio is often needed. One method of increasing the width of a 4:3 image to fill a 16:9 display is to apply horizontal magnification to regions adjacent to the left and right edges of the image, whilst leaving the central image region unchanged. The horizontal magnification factor in the image-edge regions may vary smoothly between a higher value close to the image edges and a lower value at the junctions between the edge regions and the central region. The image is thus differently-rescaled in different image regions.

It is helpful to be able to detect automatically that this type of 'non-uniform aspect ratio conversion' has been applied to an image. Such a detector can form part of a broadcast-chain monitoring or quality-assurance system.

SUMMARY

The invention consists in one aspect in a method and apparatus for detecting non-uniform spatial scaling of an image in a particular direction in which the said image is divided into regions and a directional measure of total spatial frequency energy is evaluated in the said direction for at least two of the said regions and a measure of non-uniform spatial scaling is derived from a ratio of two directional spatial frequency energy totals evaluated over two respective regions or groups of regions.

Advantageously the said directional spatial frequency energy totals are normalised by dividing them by respective other directional or non-directional spatial frequency energy totals.

Suitably the said division is by a directional spatial frequency energy total evaluated orthogonally to the said direction.

In a preferred embodiment:
the said measures of directional spatial frequency energy are sums of magnitudes of differences between the values of adjacent pixels that represent the said image;
the said pixel values are luminance values;
the said direction is horizontal and the said ratio is the ratio of the horizontal spatial frequency energy evaluated over an image middle image region to the total horizontal spatial frequency energy evaluated over two image side regions; and,
results from the analysis of a plurality of images from a sequence of related images are combined.

In one embodiment, the invention provides a method of detecting non-uniform spatial scaling of an image in a particular direction. The method includes the acts of dividing, by an active image process executing on a programmable apparatus, the image into regions, and comparing, by the programmable apparatus executing a plurality of energy measurement functions, respective directional measures of spatial frequency energy in the particular direction for at least two of the regions.

In another embodiment the invention provides an apparatus for detecting non-uniform spatial scaling of an image in a particular direction. The apparatus includes an active image detector, a plurality of energy measurement units, and a plurality of comparators. The active image detector divides the image into regions. The plurality of energy measurement units provide a directional measure of total spatial frequency energy. The plurality of comparators evaluate directional spatial frequency energy totals for at least two of the regions. A measure of non-uniform spatial scaling is derived from a ratio of two directional spatial frequency energy totals evaluated over two respective regions or groups of regions.

In another embodiment the invention provides a non-transitory computer readable medium containing instructions adapted to cause a programmable apparatus to implement a method of detecting non-uniform spatial scaling of an image in a particular direction. The method includes the acts of dividing the image into regions, and comparing respective directional measures of spatial frequency energy in the direction for at least two of the regions.

Other aspects of the invention will become apparent by consideration of the detailed description and accompanying drawings.

DETAILED DESCRIPTION

Figure 1:
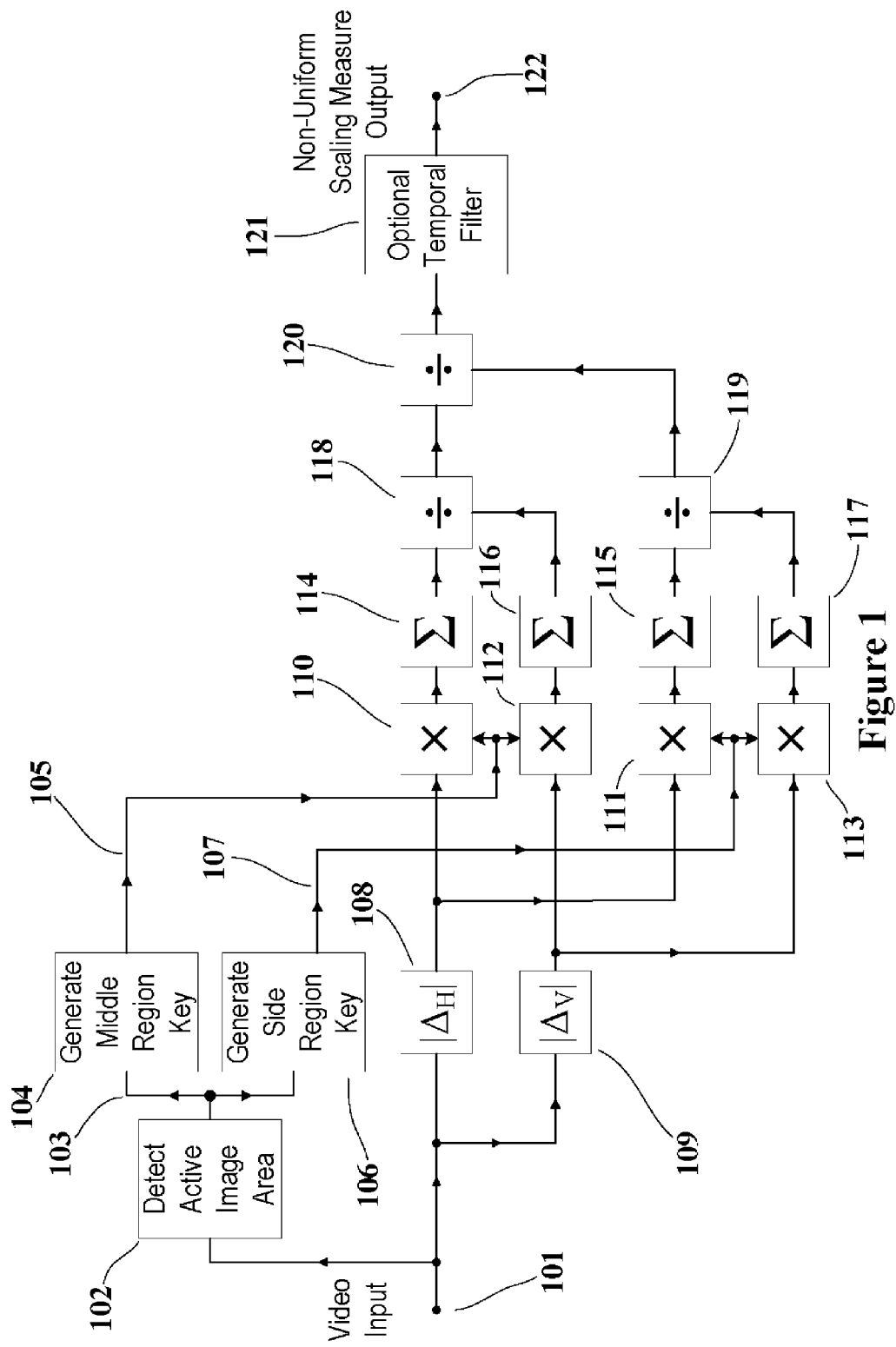
FIG. 1 shows a block diagram of an image analysis process according to an exemplary embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

An important area of application for the invention is television, and a system for analysing television images to detect non-uniform horizontal scaling will now be described with reference to FIG. 1. A video input (101) comprising a temporal sequence of frames, each of which is represented as a set of pixels, is analysed. This input is passed to an active image area detection process (102), which forms an active image area description signal (103). This signal is active in those parts of the input frames that are occupied by picture information and inactive in those parts of the input frames that correspond to blank regions, such as the 'black bands' or 'side curtains' introduced by some aspect ratio conversion processes.

There are a number of methods of detecting blank border regions in an image; one is disclosed in UK patent application 0806050.1. Another, very simple method is to find the average luminance level of every vertical column of pixels, and the average luminance level of every horizontal row of pixels (or television line), and to compare each of these average values with a threshold somewhat higher than black. A suitable threshold level is higher than the black level by about 4% of the white to black difference. Pixels whose corresponding rows and columns both have average luminance values exceeding the threshold are considered not to be border pixels, and the active image signal is set active for these pixels; the active image signal is set inactive for all other pixels. There may be errors in finding the active area due to ringing of spatial filters, and these can be eliminated by 'eroding' the active area signal at the top, bottom and sides of the active area, typically by about five pixels at each side and about two pixels at the top and bottom of a 720 pixel wide by 576 pixel high image.

The active image area description signal (103) controls two 'region key' generators that identify separate, horizontally-separated regions within the frame. A 'middle region' key generator (104) generates a middle region key (105) that has a value near unity for a set of adjacent columns of pixels at the horizontal centre of the frame and a low value elsewhere. A 'side region' key generator (106) generates a side region key (107) that has a value near unity in two sets of columns of adjacent pixels located symmetrically close to the left and right sides of the frame, and a low value elsewhere.

The region keys (105) and (106) are set to zero outside the active image area as defined by the active image area description signal (103). Typically there is no change in either key with vertical position other than that due to the area description signal (103).

Figure 2A:
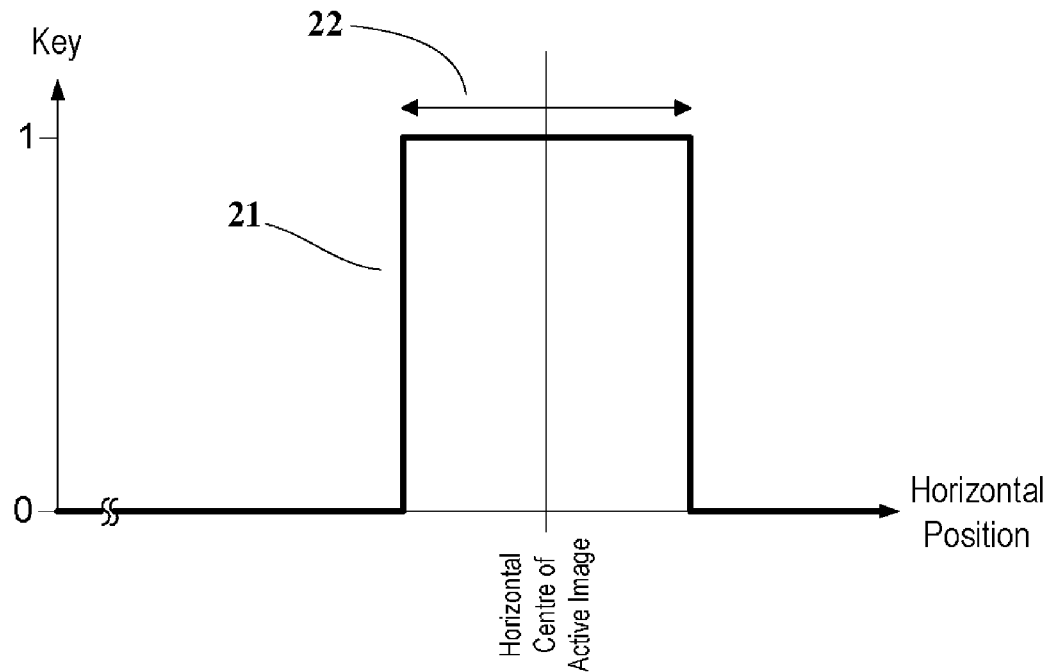
FIG. 2 shows two key signals for identification of a middle image region and a pair of side image regions respectively.

FIG. 2 shows graphs of key values versus horizontal position. A middle key is shown at (21) in FIG. 2a; it is equal to unity for a band of pixels located at the centre of the frame, and is zero elsewhere. For a frame that is 720 pixels wide the width (22) this band is typically 60 pixels.

Figure 2B:
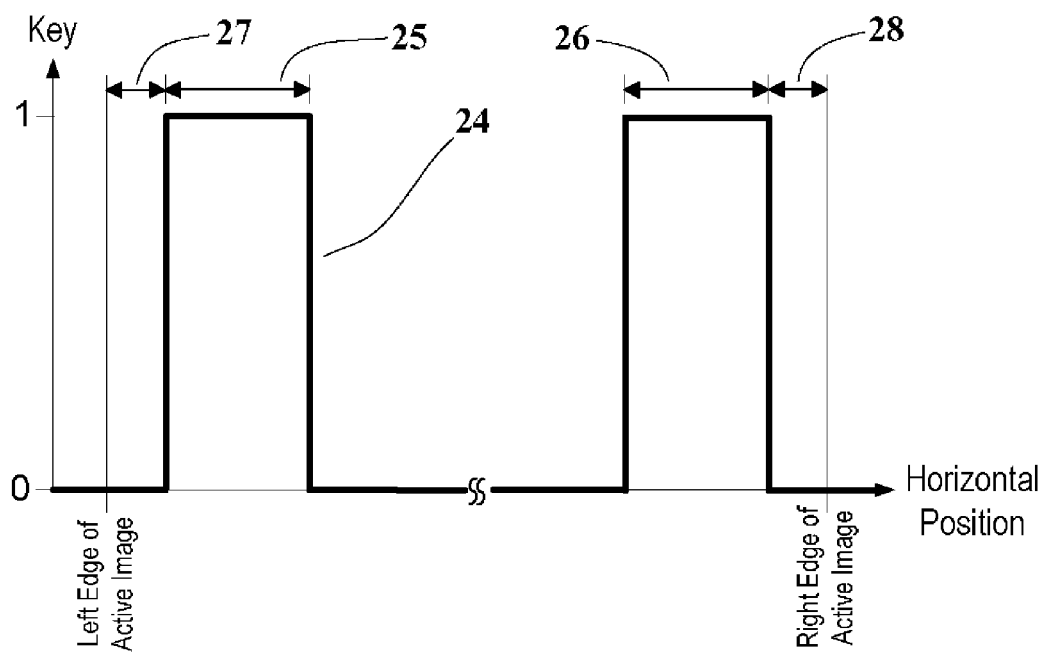

A side key is shown at (24) in FIG. 2b; it is equal to unity in two bands of pixels located close to the edges of the frame as defined by the active image area description signal (103), and is zero elsewhere. The widths (25) (26) of the two bands are half the width (22) of the middle key. For a frame that is 720 pixels wide the distances (27) (28) between the outer edges of the two bands and the respective edges of the active image area as defined by the active image area description signal (103) are both typically 5 pixels.

Returning to FIG. 1, the video input (101) is passed to a horizontal energy measurement block (108), and a vertical energy measurement block (109). These energy measurement blocks form respective measures of horizontal and vertical spatial-frequency energy for each of the pixels of the video input (101).

A suitable measure of the directional spatial-frequency energy of a pixel is the magnitude of the luminance difference between that pixel and an adjacent pixel; vertical spatial-frequency energy is evaluated by taking the difference from the adjacent pixel below the pixel being assessed, and horizontal spatial-frequency energy is evaluated by taking the difference from the adjacent pixel to the left of the pixel being assessed. However, there is a particular problem with television frames in that they may be interlaced, or may have been derived from interlaced frames. In order to avoid aliased vertical frequency energy due to interlace contributing to the vertical energy measure, the vertical difference is taken over a distance of two pixels, so that the difference is evaluated between pixels that would be in the same interlaced field.

This can be expressed mathematically as:

$|\Delta_H| = |Y_{i,j} - Y_{(i-1),j}|$ $|\Delta_V| = |Y_{i,j} - Y_{i,(j-2)}|$

Where:

$|\Delta_H|$ denotes horizontal spatial-frequency energy;

$|\Delta_V|$ denotes vertical spatial-frequency energy;

$Y_{i,j}$ denotes the luminance of the pixel at Cartesian co-ordinates i,j having respective units of horizontal pixel pitch and vertical pixel pitch;

$|x|$ denotes the absolute magnitude of x; and, in each case the summation is taken over one whole frame.

The pixel horizontal energy measures are input to two multipliers (110) and (111). The multiplier (110) weights the pixel horizontal energy measures according to the middle region key (105); and, the multiplier (111) weights the pixel horizontal energy measures according to the side region key (107). Similarly, the pixel vertical energy measures are weighted by the middle region key (105) and the side region key (107) in two respective multipliers (112) and (113).

The respective outputs of the multipliers (110) to (113) are fed to respective summation blocks (114) to (117), which sum each of the multiplier outputs over one frame. The four summations thus represent horizontal and vertical total spatial frequency values for the middle region and the (combined) side regions of the current frame. The summations for each frame are used to form a measure of non-uniform spatial scaling for that frame.

If the edge regions have been horizontally scaled differently from the middle region, then it is likely that the total horizontal spatial frequency energy per unit area will be different in the differently-scaled regions. A region that has been expanded will have lower horizontal-frequency energy, and a region that has been contracted will have higher horizontal-frequency energy. However, the energy values will also depend on picture content, and so differences in the horizontal energy values may not necessarily represent differences in applied re-scaling. This difficulty can be reduced by 'normalising' each horizontal frequency sum by dividing it by the corresponding vertical frequency sum for the same region.

A divider (118) forms a normalised middle region horizontal energy measure by dividing the total middle region horizontal energy from the summation block (114) by the total middle region vertical energy from the summation block (116). And, similarly, a further divider (119) forms a normalised side region horizontal energy measure by dividing the total side region horizontal energy from the summation block (115) by the total side region vertical energy from the summation block (117).

The ratio of the two, regional, normalised horizontal energy measures gives a measure of the difference in horizontal scaling between the middle and edge regions. This ratio is determined by a divider (120). In some implementations it may be advantageous to reduce the number of division processes and compute the horizontal scaling difference by two multiplications and one division as follows:

Horizontal scaling difference=$(\Sigma|\Delta_{HMiddle}| \times \Sigma|\Delta_{VSide}|) \div (\Sigma|\Delta_{HSide}| \times \Sigma|\Delta_{VMiddle}|)$ Where:

$\Sigma|\Delta_{HMiddle}|$ denotes the total horizontal spatial-frequency energy of the middle region;

$\Sigma|\Delta_{VMiddle}|$ denotes the total vertical spatial-frequency energy of the middle region;

$\Sigma|\Delta_{HSide}|$ denotes the total horizontal spatial-frequency energy of the two side regions; and, $\Sigma|\Delta_{Vside}|$ denotes the total vertical spatial-frequency energy of the two side regions In any event it will be necessary to avoid division by zero, for example by adding a small constant to the divisor(s).

The output from the divider (120) thus gives, for each frame, a measure of the horizontal scaling difference between the middle region and the side regions. If the input (101) has been converted from 4:3 aspect ratio to 16:9 aspect ratio by applying horizontal expansion at the sides of the frame, then this output will typically be greater than unity.

When a sequence of frames is processed, which will normally be the case in television applications, the reliability of the detection can be improved by applying a low pass filter to the sequence of horizontal scaling difference measures from the divider (120). An optional temporal low pass filter (121), which can conveniently be a recursive filter, combines the results from several frames in the sequence to obtain a more-reliable non-uniform scaling measure output (122). This output can be compared with a greater than unity threshold, and the input (101) classified as non-uniformly aspect-ratio-converted when the threshold is exceeded. The choice of threshold value will depend on the characteristics of the non-uniform scaling that is to be detected, typically the value will be less than 1.5. However, in some applications, it may be useful to retain the un-thresholded output (122), or the unfiltered ratio of normalised, regional energy values (i.e. the input to the filter (121)) and store it as metadata associated with the video input (101).

The skilled person will appreciate that other implementations of the above-described process are possible, including implementations operating faster or slower than real time on files of image data.

There are a number of variations and refinements of the system described above that fall within the scope of the invention and some of these will now be described.

Single images, or sequences of images where the sequence does not represent time may be analysed.

The processing need not be limited to the active image area, or the limitation may only applied in one direction.

The overall result for a frame, or the individual energy difference ratios used to compute that result, can be weighted by a measure of the total amount of detail in the whole frame or a representative part of the frame. This measure can be the rectified output of a spatial high pass filter, or a sum of inter-pixel difference magnitudes. This measure quantifies the confidence in the result; analysis results from frames where the measure of detail is low could be disregarded.

If motion detection or motion measurement data is available for the frames being analysed, an allowance can be made for motion blur, which will reduce the measured spatial-frequency energy. The measured values could be increased in moving areas before being used to detect non-uniform scaling.

The regional key signal generators (104) and (106) in FIG. 1) could generate smoothly-varying keys so that more pixels contribute to the regional energy summations, but with the weights of some pixels reduced to compensate for these additional pixels. The optimum key profiles will depend on the type of non-uniform scaling that is to be detected, however pixels near to the sides of the active area that are likely to be horizontally expanded may justify higher weighting than pixels at the inner edges of the side regions.

There is no need for the total area of the side regions to be equal to the area of the middle region, and the different regions may or may not be contiguous.

Other spatial frequency energy measures may be used, such as a sum of squares of inter-pixel difference values.

Pixel difference values other than luminance differences may be used, for example chrominance difference may contribute to the difference value.

Various features and advantages of the invention are set forth in the following claims.

What is claimed is:

1. A method of detecting non-uniform spatial scaling of an image in a particular direction, the method comprising:
    dividing, by an active image process executing on a programmable apparatus, the image into regions;
    deriving for at least two of the regions a directional measure of spatial frequency energy in the particular direction; and
    comparing, by the programmable apparatus, said respective directional measures of spatial frequency energy in the particular direction for at least two of the regions to detect non-uniform spatial scaling in the particular direction;
    wherein a directional measure of total spatial frequency energy is evaluated in the particular direction for at least two of the regions and
    a measure of non-uniform spatial scaling is derived from a ratio of two said directional measures of total spatial frequency energy evaluated over two respective regions or groups of regions;
    where the particular direction is horizontal, the regions into which the image is divided comprise an image middle region and two image side regions respectively disposed on opposite horizontal sides of the image middle region and the ratio is the ratio of the horizontal directional measure of total spatial frequency energy evaluated over the image middle image region to the horizontal directional measure of total spatial frequency energy evaluated over the two image side regions.

2. A method according to claim 1 where the directional measures of total spatial frequency energy are normalised by dividing them by respective other directional or non-directional spatial frequency energy totals.

3. A method according to claim 2 where the division is by a directional measure of total spatial frequency energy evaluated orthogonally to the particular direction.

4. A method according to claim 1 where the directional measures of spatial frequency energy are sums of magnitudes of differences between the values of adjacent pixels that represent the image.

5. A method according to claim 1 where the directional measures of spatial frequency energy are sums of squares of differences between the values of adjacent pixels that represent the image.

6. A method according to claim 4 where the values of adjacent pixels are luminance values.

7. A method according to claim 5 where the values of adjacent pixels are luminance values.

8. A method according to claim 1 in which results from analysis of a plurality of images from a sequence of related images are combined.

9. An apparatus for detecting non-uniform spatial scaling of an image in a particular direction, the apparatus comprising:
    an active image detector dividing the image into regions;
    a plurality of energy measurement units providing a directional measure of total spatial frequency energy; and
    a plurality of comparators for evaluating directional spatial frequency energy totals for at least two of the regions;
    wherein a measure of non-uniform spatial scaling is derived from a ratio of two directional spatial frequency energy totals evaluated over two respective regions or groups of regions, wherein the directional spatial frequency energy totals are normalised by dividing them by respective other directional or non-directional spatial frequency energy totals;

wherein the division is by a directional spatial frequency energy total evaluated orthogonally to the particular direction.

10. An apparatus according to claim 9, wherein the directional measures of spatial frequency energy are sums of magnitudes of differences between the values of adjacent pixels that represent the image.

11. An apparatus according to claim 9, wherein the directional measures of spatial frequency energy are sums of squares of differences between the values of adjacent pixels that represent the image.

12. An apparatus for detecting non-uniform spatial scaling of an image in a particular direction, the apparatus comprising:

an active image detector dividing the image into regions;

a plurality of energy measurement units providing a directional measure of total spatial frequency energy; and a plurality of comparators for evaluating directional spatial frequency energy totals for at least two of the regions;

wherein a measure of non-uniform spatial scaling is derived from a ratio of two directional spatial frequency energy totals evaluated over two respective regions or groups of regions, wherein the particular direction is horizontal, the regions into which the image is divided comprise an image middle region and two image side regions respectively disposed on opposite horizontal sides of the image middle region and the ratio is the ratio of the horizontal spatial frequency energy evaluated over the image middle image region to the total horizontal spatial frequency energy evaluated over the two image side regions.

* * * * *